(12) United States Patent
Hah et al.

(10) Patent No.: US 10,103,372 B2
(45) Date of Patent: Oct. 16, 2018

(54) LITHIUM SECONDARY BATTERY INCLUDING GAS PERMEABLE MEMBRANE

(71) Applicant: LG Chem, Ltd., Seoul (KR)

(72) Inventors: Hoe Jin Hah, Daejeon (KR); Ji Yoon Kwon, Daejeon (KR); Je Young Kim, Daejeon (KR); Kyoung Ho Kim, Daejeon (KR); Il Hong Kim, Daejeon (KR); In Sung Uhm, Daejeon (KR)

(73) Assignee: LG Chem, Ltd. (KR)

( * ) Notice: Subject to any disclaimer, the term of this patent is extended or adjusted under 35 U.S.C. 154(b) by 42 days.

(21) Appl. No.: 14/769,348

(22) PCT Filed: Jun. 11, 2014

(86) PCT No.: PCT/KR2014/005107
§ 371 (c)(1),
(2) Date: Aug. 20, 2015

(87) PCT Pub. No.: WO2015/012487
PCT Pub. Date: Jan. 29, 2015

(65) Prior Publication Data
US 2016/0156007 A1 Jun. 2, 2016

(30) Foreign Application Priority Data

Jul. 25, 2013 (KR) .................. 10-2013-0088011

(51) Int. Cl.
*H01M 2/12* (2006.01)
*H01M 10/052* (2010.01)
(Continued)

(52) U.S. Cl.
CPC .......... *H01M 2/1264* (2013.01); *H01M 2/024* (2013.01); *H01M 2/0217* (2013.01);
(Continued)

(58) Field of Classification Search
CPC ........... H01M 10/052; H01M 10/0525; H01M 10/058; H01M 2/0217; H01M 2/024;
(Continued)

(56) References Cited

U.S. PATENT DOCUMENTS 3,278,339 A 10/1966 Reilly et al.
4,256,813 A 3/1981 Kniazzeh
(Continued)

FOREIGN PATENT DOCUMENTS

CN 202503086 U 10/2012
JP 56128570 A 10/1981
(Continued)

OTHER PUBLICATIONS

Supplemental Search Report from European Application No. 14830351.4, dated Sep. 9, 2016.
(Continued)

*Primary Examiner* — Ula C Ruddock
*Assistant Examiner* — Ben Lewis
(74) *Attorney, Agent, or Firm* — Lerner, David, Littenberg, Krumholz & Mentlik, LLP

(57) ABSTRACT

Disclosed is a lithium secondary battery including an electrolyte, an electrode laminate, a battery case including a space part in which the electrolyte and the electrode laminate are embedded, and a sealing part surrounding the space part, and a gas permeable membrane.

19 Claims, 1 Drawing Sheet

(51) Int. Cl.
　　　*H01M 10/058* (2010.01)
　　　*H01M 2/02* (2006.01)
　　　*H01M 2/16* (2006.01)
　　　*H01M 2/36* (2006.01)
　　　*H01M 10/0525* (2010.01)

(52) U.S. Cl.
　　　CPC ....... *H01M 2/0272* (2013.01); *H01M 2/1653* (2013.01); *H01M 2/367* (2013.01); *H01M 10/052* (2013.01); *H01M 10/058* (2013.01); *H01M 10/0525* (2013.01); *Y02T 10/7011* (2013.01)

(58) Field of Classification Search
　　　CPC .. H01M 2/0272; H01M 2/126; H01M 2/1653; H01M 2/367; Y02T 10/7011
　　　See application file for complete search history.

(56) References Cited

U.S. PATENT DOCUMENTS

| | | | |
|---|---|---|---|
| 5,779,904 A * | 7/1998 | Ruderman | B01L 367/0051 210/490 |
| 7,132,194 B2 | 11/2006 | Mizutani | |
| 2007/0077485 A1 * | 4/2007 | Takamura | H01M 2/0255 429/82 |
| 2009/0068560 A1 * | 3/2009 | Hasumi | H01M 4/136 429/221 |
| 2011/0111294 A1 | 5/2011 | Lopez et al. | |
| 2012/0164513 A1 | 6/2012 | Peng et al. | |
| 2013/0309581 A1 | 11/2013 | Yamaguchi et al. | |
| 2014/0226261 A1 | 8/2014 | Sakata | |
| 2015/0079480 A1 | 3/2015 | Ahn et al. | |

FOREIGN PATENT DOCUMENTS

| | | | | |
|---|---|---|---|---|
| JP | S5887753 A | | 5/1983 | |
| JP | S61093551 A | | 5/1986 | |
| JP | H11104859 A | | 4/1999 | |
| JP | 2007149378 A | | 6/2007 | |
| JP | 2007317481 A | | 12/2007 | |
| JP | 2008-077945 | * | 4/2008 | ............. H01M 2/12 |
| JP | 2008077945 A | | 4/2008 | |
| JP | 2011233747 A | | 11/2011 | |
| JP | 2012084261 A | | 4/2012 | |
| JP | 2012190639 A | | 10/2012 | |
| KR | 100864694 B1 | | 10/2008 | |
| KR | 20120124704 A | | 11/2012 | |
| KR | 20120128125 A | | 11/2012 | |
| KR | 20130011976 A | | 1/2013 | |
| KR | 20130012665 A | | 2/2013 | |
| WO | 2013051273 A1 | | 4/2013 | |
| WO | 2014010936 A1 | | 1/2014 | |

OTHER PUBLICATIONS

International Search Report for Application No. PCT/KR2014/005107 dated Sep. 29, 2014.
Supplemental European Search Report for EP Application 14830351.4 dated Jan. 9, 2017.

* cited by examiner

[FIG. 1]
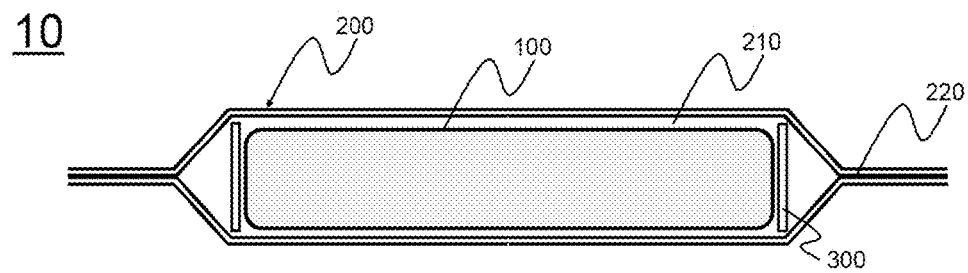
[FIG. 2]
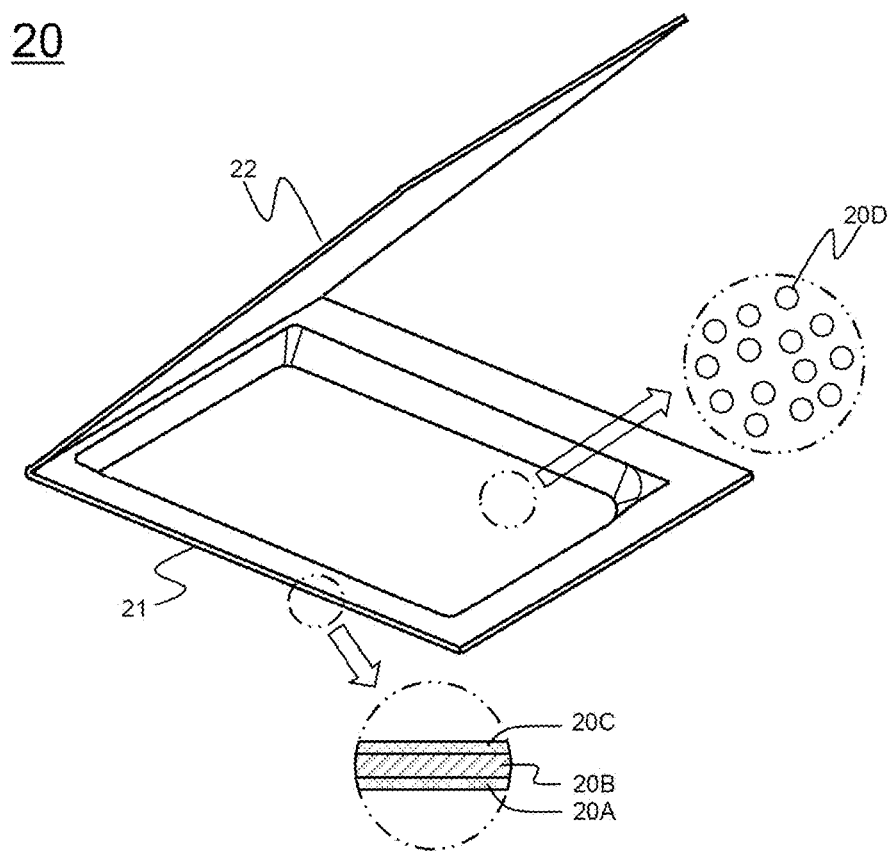

LITHIUM SECONDARY BATTERY INCLUDING GAS PERMEABLE MEMBRANE

CROSS REFERENCE TO RELATED APPLICATIONS

The present application is a national phase entry under 35 U.S.C. § 371 of International Application No. PCT/KR2014/005107, filed Jun. 11, 2014, which claims priority from Korean Patent Application No. 10-2013-0088011 filed Jul. 25, 2013, all of which are hereby incorporated herein by reference.

TECHNICAL FIELD

The present invention relates to a lithium secondary battery including a gas permeable membrane.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, is underway and such lithium secondary batteries are commercially available and widely used.

In general, secondary batteries have a structure in which an electrode assembly including a positive electrode, a negative electrode, and a separator disposed therebetween is accommodated in a laminated or wound form in a battery case made of a metal can or a laminate sheet and an electrolyte is injected thereinto or the electrode assembly is impregnated with an electrolyte.

One of main research subjects in a pouch type secondary battery composed of high-voltage battery cells among such secondary batteries is to prevent performance deterioration of batteries due to leakage of gas when the battery is subjected to activation and in use. For example, during activation, the secondary battery generates a large amount of gas, and the generated gas damages a sealing part of a battery case and is leaked outside. Subsequently, an electrolyte leaks to the damaged sealing part, whereby performance of the battery is deteriorated. In addition, when, during use, the electrolyte is decomposed due to an abnormal battery operation state such as an overcharging exceeding an allowed current and voltage, exposure to high temperature and the like and gas is generated, the battery is damaged as described above.

Therefore, there is an urgent need to develop a novel lithium secondary battery that addresses the problems described above.

DISCLOSURE

Technical Problem

Therefore, the present invention has been made to solve the above problems and other technical problems that have yet to be resolved.

The present invention aims to provide a lithium secondary battery for emitting generated gas to the outside of the battery and preventing electrolyte leakage when the battery is subjected to activation and in use.

Technical Solution

In accordance with one aspect of the present invention, provided is a lithium secondary battery including:

an electrolyte;
an electrode laminate;
a battery case including a space part in which the electrolyte and the electrode laminate are embedded, and a sealing part surrounding the space part; and
a gas permeable membrane.

That is, the lithium secondary battery according to the present invention includes the gas permeable membrane, thereby preventing that generated gas is emitted to the outside and an electrolyte leaks, when the battery is subjected to activation and in use.

The gas permeable membrane may be installed in the space part.

The gas permeable membrane may be liquid-impermeable. Therefore, leakage of an electrolyte may be prevented.

The pore size of the gas permeable membrane may be 2.0 Å to 10 Å. When the pore size is less than 2.0 Å, gas may not be sufficiently emitted to the outside. On the other hand, when the pore size is greater than 10 Å, the electrolyte may leak. Therefore, the proper pore size of the gas permeable membrane may be within the range.

The gas permeable membrane may be a selective gas permeable membrane through which oxygen ($O_2$) and carbon dioxide ($CO_2$) are selectively permeated.

The pore size of the selective gas permeable membrane may be 2.0 Å to 10 Å. When the pore size is less than 2.0 Å, oxygen and carbon dioxide may not be sufficiently emitted to the outside. On the other hand, when the pore size is greater than 10 Å, in addition to oxygen and carbon dioxide, an electrolyte may leak. Therefore, a proper pore size of the selective gas permeable membrane may be within the range.

The gas permeable membrane may be composed of polyethylene terephthalate (PET), but the present invention is not limited thereto.

The gas permeable membrane may be installed between the electrode laminate and the sealing part, in vertical section.

The gas permeable membrane may divide a space part in vertical section.

The gas permeable membrane may penetrate the sealing part.

The battery case may include a first case and a second case sealing the battery case by binding to the first case, and the gas permeable membrane may be interposed on an interface between the first case and the second case.

In accordance with one aspect of the present invention, provided is a battery case including a first case and a second case sealing the battery case by binding to the first case, where the first case and the second case are composed of a laminate sheet including an inner sealant layer, a barrier layer and an outer coating layer, and at least one of the first case and the second case is entirely or partially composed of a porous laminate sheet.

The porous laminate sheet may include an inner porous sealant layer, a porous barrier layer and an outer porous coating layer, and may have a pore size of 2.0 Å to 10 Å.

The inner sealant layer may be composed of non-oriented polypropylene, the barrier layer may be composed of metal, and the outer coating layer may be composed of polyethylene terephthalate, but the present invention is not limited thereto.

The inner porous sealant layer may be composed of porous non-oriented polypropylene, the porous barrier layer may be composed of porous metal, and the outer porous coating layer may be composed of porous polyethylene terephthalate, but the present invention is not limited thereto.

The second case may extend from a portion of the first case.

The first case and the second case may be separated independent members.

In accordance with one aspect of the present invention, provided is a lithium secondary battery including:
the battery case;
an electrode laminate including at least one positive electrode, at least one negative electrode and at least one separator laminated between the at least one positive electrode and the at least one negative electrode; and
an electrolyte.

The lithium secondary battery may include at least one lithium transition metal oxide selected of a compound represented by Formula (1) below and a compound represented by Formula (2) below as a positive electrode active material.

$$Li_xM_yMn_{2-y}O_{4-z}A_z \qquad (1)$$

wherein $0.9 \le x \le 1.2$, $0 < y < 2$ and $0 \le z < 0.2$;
M is at least one element selected from the group consisting of Al, Mg, Ni, Co, Fe, Cr, V, Ti, Cu, B, Ca, Zn, Zr, Nb, Mo, Sr, Sb, W, Ti and Bi; and
A is at least one monovalent or divalent anion.

$$(1-x)LiM'O_{2-y}A_{y'} \cdot xLi_2MnO_{3-y'}A_{y'} \qquad (2)$$

wherein M' is $Mn_aM_b$;
M is at least one selected from the group consisting of Ni, Ti, Co, Al, Cu, Fe, Mg, B, Cr, Zr, Zn and Period II transition metals;
A is at least one selected from the group consisting of anions such as $PO_4$, $BO_3$, $CO_3$, F and $NO_3$;
$0 < x < 1$; $0 < y \le 0.02$; $0 < y' \le 0.02$; $0.5 \le a \le 1.0$; $0 \le b \le 0.5$; and $a+b=1$.

The lithium secondary battery may include a carbon based material and/or Si as a negative electrode active material.

The lithium secondary battery may be a lithium ion battery, a lithium ion polymer battery or a lithium polymer battery.

The electrode may be a positive electrode or a negative electrode and may be fabricated using a manufacturing method including the following processes.

The method of manufacturing an electrode includes:
preparing a binder solution by dispersing or dissolving a binder in a solvent,
preparing an electrode slurry by mixing the binder solution with an electrode active material and a conductive material,
coating the electrode slurry onto a current collector,
drying the electrode, and
compressing the electrode to a certain thickness.

In some cases, the method may further include drying the compressed electrode.

The preparing of the binder solution is a process of preparing a binder solution by dispersing or dissolving a binder in a solvent.

The binder may be all binders known in the art and, in particular, may be one selected from the group consisting of fluorine resin-based binders including polyvinylidene fluoride (PVdF) or polytetrafluoroethylene (PTFE), rubber-based binders including styrene-butadiene rubber, acrylonitrile-butadiene rubber or styrene-isoprene rubber, cellulose-based binders including carboxymethylcellulose (CMC), starch, hydroxypropylcellulose or regenerated cellulose, polyalcohol-based binders, polyolefin-based binders including polyethylene or polypropylene, polyimide-based binders, polyester-based binders, mussel adhesives, and silane-based binders, or a mixture or copolymer of at least two of the above-listed binders.

The solvent may be selectively used according to kind of a binder, e.g., an organic solvent such as isopropyl alcohol, N-methylpyrrolidone (NMP), acetone or the like, water, or the like.

In a specific embodiment of the present invention, a binder solution for positive electrodes may be prepared by dispersing or dissolving PVdF in N-methylpyrrolidone (NMP), and a binder solution for negative electrodes may be prepared by dispersing or dissolving styrene-butadiene rubber (SBR)/carboxymethylcellulose (CMC) in water.

An electrode slurry may be prepared by mixing/dispersing an electrode active material and a conductive material in the binder solution. The prepared electrode slurry may be transferred to a storage tank and stored prior to use in a coating process. To prevent the electrode slurry from becoming hard, the electrode slurry may be continuously stirred in the storage tank.

The electrode active material may be a positive electrode active material or a negative electrode active material.

In particular, the positive electrode active material may be layered compounds such as lithium cobalt oxide ($LiCoO_2$) and lithium nickel oxide ($LiNiO_2$) or compounds substituted with one or more transition metals; lithium manganese oxides represented by $Li_{1+y}Mn_{2-y}O_4$ where $0 \le y \le 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \le y \le 0.3$; lithium manganese composite oxides having the formula $LiMn_{2-y}M_yO_2$ where M=Co, Ni, Fe, Cr, Zn, or Ta, and $0.01 \le y \le 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; $Fe_2(MoO_4)_3$; or the like, but embodiments of the present invention are not limited thereto.

In a non-limiting embodiment, the electrode active material may include a spinel-structure lithium metal oxide represented by Formula (1) below as a positive electrode active material:

$$Li_xM_yMn_{2-y}O_{4-z}A_z \qquad (1)$$

wherein $0.9 \le x \le 1.2$, $0 < y < 2$ and $0 \le z < 0.2$,
M is at least one element selected from the group consisting of Al, Mg, Ni, Co, Fe, Cr, V, Ti, Cu, B, Ca, Zn, Zr, Nb, Mo, Sr, Sb, W, Ti and Bi, and
A is at least one monovalent or divalent anion.

A maximum substitution amount of A may be less than 0.2 mol % and, in particular, A may be at least one anion selected from the group consisting of halogens such as F, Cl, Br and I, S, and N.

Due to substitution of these anions, bonding strength between the anion and the transition metal is increased, structural transition of the compound of Formula (1) is prevented, and thus lifespan of the lithium secondary battery may be enhanced. On the other hand, when the substitution amount of A is too large ($t \ge 0.2$), lifespan characteristics of the lithium secondary battery may be rather deteriorated due to an unstable crystal structure of the compound of Formula (1).

In particular, the spinel-structure lithium metal oxide of Formula (1) may be a lithium metal oxide represented by Formula (1a) below:

$$Li_xNi_yMn_{2-y}O_4 \qquad (1a)$$

wherein $0.9 \le x \le 1.2$ and $0.4 \le y \le 0.5$.

More specifically, the lithium metal oxide may be $LiNi_{0.5}Mn_{1.5}O_4$ or $LiNi_{0.4}Mn_{1.6}O_4$.

The negative electrode active material may further include, for example, carbon such as hard carbon, graphite-based carbon, or the like; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene and the like; Li—Co—Ni-based materials; and the like.

In a non-restrictive embodiment, the electrode active material may include a lithium metal oxide as a negative electrode active material, in which the lithium metal oxide may be represented by Formula (3) below:

$$Li_aM'_bO_{4-c}A_c \qquad (3)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ wherein a and b are determined according to oxidation number of M';

$0 \leq c < 0.2$ wherein c is determined according to oxidation number of A; and A is at least one monovalent or divalent anion.

The lithium metal oxide of Formula (3) may be represented by Formula (4) below:

$$Li_aTi_bO \qquad (4)$$

wherein $0.5 \leq a \leq 3$ and $1 \leq b \leq 2.5$.

Examples of the lithium metal oxide include, but are not limited to, $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$.

In a non-restrictive embodiment, the lithium metal oxide may be $Li_{1.33}Ti_{1.67}O_4$ or $LiTi_2O_4$. $Li_{1.33}Ti_{1.67}O_4$ has a spinel structure having a small change in crystal structure during charge/discharge and high reversibility.

The lithium metal oxide may be prepared using a manufacturing method known in the art, for example, solid-state reaction, a hydrothermal method, a sol-gel method, or the like.

The lithium metal oxide may be in the form of secondary particles in which primary particles are agglomerated with one another.

A diameter of the secondary particles may be 200 nm to 30 μm.

When the diameter of the secondary particles is less than 200 nm, a large amount of solvent is needed in the process of preparing a negative electrode slurry and, thus, productivity is reduced and it is difficult to control the amount of moisture. When the diameter of the secondary particles exceeds 30 μm, diffusion rate of lithium ions becomes slow and, thus, it may be difficult to achieve high output.

The amount of the lithium metal oxide may be 50 wt % to 100 wt % based on a total weight of the negative electrode active material.

A case in which the amount of lithium titanium oxide is 100 wt % based on the total weight of the negative electrode active material means that the negative electrode active material is formed of lithium titanium oxide alone.

The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fiber and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may further optionally include a filler or the like, as desired. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry is a process of coating the electrode slurry on a current collector in a predetermined pattern and to a uniform thickness by passing through a coater head.

The coating of the electrode slurry may be performed by applying the electrode slurry to the current collector and uniformly dispersing the electrode slurry thereon using a doctor blade. In another embodiment, the coating process may be performed by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A positive electrode current collector may have fine irregularities at a surface thereof to increase adhesion between a positive electrode active material and the positive electrode current collector and be used in any of various forms including films, sheets, foils, nets, porous structures, foams, and non-woven fabrics. In particular, the positive electrode current collector may be a metal current collector, e.g., an Al current collector, and a negative electrode current collector may be a metal current collector, e.g., a Cu current collector. The electrode current collector may be metal foil, e.g., Al foil or Cu foil.

The drying process is a process of removing solvent and moisture from the electrode slurry to dry the electrode slurry coated on the metal current collector. In a specific embodiment, the drying process is performed in a vacuum oven at 50 to 200° C. for one day or less.

The electrode manufacturing method may further include a cooling process after the drying process. The cooling process may be performed by slowly cooling to room temperature such that a recrystallized structure of the binder is satisfactorily formed.

To increase capacity density of the coating-completed electrode and to increase adhesion between the current collector and the corresponding active material, the electrode may be compressed to a desired thickness by passing between two high-temperature-heated rolls. This process is referred to as a rolling process.

Before passing the electrode between the two high-temperature-heated rolls, the electrode may be subjected to a preheating process. The preheating process is a process of preheating the electrode before passing between the rolls in order to enhance compression effects of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be further performed. The cooling process may be performed by slowly cooling to room temperature such that a recrystallized structure of the binder is satisfactorily formed.

The copolymer layer is a separator separating the positive electrode from the negative electrode and, when a solid electrolyte such as a polymer or the like is used as an electrolyte, the solid electrolyte may also act as a separator.

The separator may be an insulating thin film having high ion permeability and mechanical strength. A pore diameter of the separator is typically 0.01 to 10 μm and a thickness thereof is typically 5 to 300 μm.

As the separator, sheets or non-woven fabrics made of an olefin polymer such as polypropylene, glass fibers, or polyethylene, which have chemical resistance and hydrophobicity, Kraft paper, or the like may be used. Commercially available separators include Celgard type products (Celgard® 2400, 2300 (Hoechest Celanese Corp.)), polypropylene separators (Ube Industries Ltd. or Pall RAI), polyethylene type separators (Tonen or Entek), and the like.

In some cases, the separator may be coated with a gel polymer electrolyte in order to increase stability of the lithium secondary battery. Examples of gel polymers include, but are not limited to, polyethylene oxide, polyvinylidene fluoride, and polyacrylonitrile.

Examples of the electrode laminate include a jellyroll type electrode assembly (or a winding-type electrode assembly), a laminated electrode assembly, and a laminated and folded electrode assembly, which are known in the art.

As used herein, the laminated and folded electrode assembly may be understood to include laminated and folded electrode assemblies manufactured by arranging a unit cell having a structure in which a separator is disposed between a positive electrode and a negative electrode on a separator sheet and folding or winding the separator sheet.

In addition, the electrode laminate may include an electrode laminate in which a structure having any one of a positive electrode and a negative electrode disposed between separators is laminated in a stacked state by thermal bonding.

The electrolyte may be a non-aqueous electrolyte, an organic solid electrolyte, an inorganic solid electrolyte, or the like.

Examples of the non-aqueous electrolyte include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

A lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the electrolyte may further include carbon dioxide gas, fluoro-ethylene carbonate (FEC), propene sultone (PRS), fluoro-propylene carbonate (FPC), etc.

The present invention also provides a battery pack including the lithium secondary battery as a unit cell.

The present invention also provides a device using the battery pack as a power source.

In particular, the device may be selected from the group consisting of a mobile phone, a portable computer, a smartphone, a smart pad, a netbook computer, a light electric vehicle (LEV), an electric vehicle, a hybrid electric vehicle, a plug-in hybrid electric vehicle, and a device for storing power.

A structure and manufacturing method are publicly known in the art and, thus, detailed description thereof is omitted in the present specification.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic diagram of a lithium secondary battery according to one embodiment of the present invention; and FIG. 2 is a schematic diagram of a battery case according to another embodiment of the present invention.

MODE FOR INVENTION

Now, the present invention will be described in more detail with reference to the accompanying drawings. These examples are provided for illustrative purposes only and should not be construed as limiting the scope and spirit of the present invention.

FIG. 1 illustrates a schematic diagram of a lithium secondary battery according to one embodiment of the present invention.

Referring to FIG. 1, a lithium secondary battery 10 includes an electrode laminate 100, a battery case 200, a gas permeable membrane 300 and an electrolyte (not shown). The battery case 200 includes a space part 210 and a sealing part 220, and the space part 210 is embedded in the electrode laminate 100. The gas permeable membrane 300 is installed between the electrode laminate 100 and the sealing part 220. Therefore, gas generated from the electrode laminate 100 may be emitted to the gas permeable membrane 300 and then emitted to the outside of the battery via the sealing part 220. On the other hand, since an electrolyte may not penetrate the gas permeable membrane 300, leakage of the electrolyte may be prevented.

FIG. 2 illustrates a schematic diagram of a battery case according to another embodiment of the present invention.

Referring to FIG. 2, a battery case 20 includes a first case 21 and a second case 22. The second case 22 is extended from the first case 21.

The first case 21 and the second case 22 are composed of a laminate sheet including an inner sealant layer 20A, a barrier layer 20B and an outer coating layer 20C, the laminate sheet has multiple pores 20D. Due to such structures, gas generated from the electrode laminate may be emitted through the multiple pores 20D to the outside of the battery and an electrolyte may not penetrate pores, thereby preventing leakage of the electrolyte.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a lithium secondary battery according to the present invention includes the gas permeable membrane, thereby preventing that generated gas is emitted to the outside and an electrolyte leaks, when the battery is subjected to activation and in use.

The invention claimed is:

1. A lithium secondary battery comprising:
an electrolyte;
an electrode laminate;
a battery case comprising a space part in which the electrolyte and the electrode laminate are embedded, and a sealing part surrounding the space part; and
a gas permeable membrane,
wherein the gas permeable membrane is liquid-impermeable, and a pore size of the gas permeable membrane is 2.0 Å to 10 Å; and
wherein the gas permeable membrane is located in the space part between the electrode laminate and the sealing part, such that there is no intervening structure between the gas permeable membrane and the electrode laminate.

2. The lithium secondary battery according to claim 1, wherein the gas permeable membrane is a selective gas permeable membrane through which oxygen ($O_2$) and carbon dioxide ($CO_2$) are selectively permeated.

3. The lithium secondary battery according to claim 1, wherein the gas permeable membrane is composed of polyethylene terephthalate (PET).

4. The lithium secondary battery according to claim 1, wherein the gas permeable membrane divides the space part.

5. The lithium secondary battery according to claim 4, wherein the gas permeable membrane penetrates the sealing part.

6. The lithium secondary battery according to claim 5, wherein the battery case comprises a first case and a second case sealing the battery case by binding to the first case, and the gas permeable membrane is interposed on an interface between the first case and the second case.

7. The lithium secondary battery according to claim 1, comprising at least one lithium transition metal oxide selected of a compound represented by Formula (1) below and a compound represented by Formula (2) below as a positive electrode active material:

$$Li_xM_yMn_{2-y}O_{4-z}A_z \qquad (1)$$

wherein 0.9≤x≤1.2, 0<y<2 and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion,

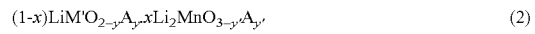

$$(1-x)LiM'O_{2-y}A_y\text{-}xLi_2MnO_{3-y'}A_{y'} \qquad (2)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$;

0<x<1; 0<y≤0.02; 0<y'≤0.02; 0.5≤a≤1.0; 0≤b≤0.5; and a+b=1.

8. The lithium secondary battery according to claim 7, comprising a carbon based material and/or Si as a negative electrode active material.

9. The lithium secondary battery according to claim 7, wherein the lithium secondary battery is a lithium ion battery, a lithium ion polymer battery or a lithium polymer battery.

10. A lithium secondary battery comprising:
an electrolyte;
an electrode laminate;
a battery case defining an open interior volume enveloped by the battery case, wherein the electrolyte and the electrode laminate are located within the open interior volume, the battery case having a sealing part defined where a first portion of the battery case and a second portion of the battery case are bound together; and
a gas permeable membrane having a first planar side and a second planar side,
wherein the gas permeable membrane is positioned within the open interior volume between the electrode laminate and the sealing part, the gas permeable membrane dividing the open interior volume, such that a first portion of the open interior volume is defined on the first planar side of the gas permeable membrane and a second portion of the open interior volume is defined on the second planar side of the gas permeable membrane.

11. The lithium secondary battery according to claim 10, wherein the gas permeable membrane is liquid-impermeable, and a pore size of the gas permeable membrane is 2.0 Å to 10 Å.

12. The lithium secondary battery according to claim 10, wherein the gas permeable membrane is a selective gas permeable membrane through which oxygen ($O_2$) and carbon dioxide ($CO_2$) are selectively permeated.

13. The lithium secondary battery according to claim 12, wherein a pore size of the selective gas permeable membrane is 2.0 Å to 10 Å.

14. The lithium secondary battery according to claim 10, wherein the gas permeable membrane is composed of polyethylene terephthalate (PET).

15. The lithium secondary battery according to claim 10, wherein the first portion of the battery case and the second portion of the battery case extend generally parallel to a common plane, the gas permeable membrane extending across the open interior volume transverse to said common plane.

16. The lithium secondary battery according to claim 10, wherein there is no intervening structure between the gas permeable membrane and the electrode laminate.

17. The lithium secondary battery according to claim 10, comprising at least one lithium transition metal oxide selected of a compound represented by Formula (1) below and a compound represented by Formula (2) below as a positive electrode active material:

$$Li_xM_yMn_{2-y}O_{4-z}A_z \quad (1)$$

wherein $0.9 \leq x \leq 1.2$, $0 < y < 2$ and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion, $$(1-x)LiM'O_{2-y'}A_{y'} \cdot xLi_2MnO_{3-y'}A_{y'} \quad (2)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$;

$0 < x < 1$; $0 < y \leq 0.02$; $0 < y' \leq 0.02$; $0.5 \leq a \leq 1.0$; $0 \leq b \leq 0.5$; and $a+b=1$.

18. The lithium secondary battery according to claim 17, comprising a carbon based material and/or Si as a negative electrode active material.

19. The lithium secondary battery according to claim 17, wherein the lithium secondary battery is a lithium ion battery, a lithium ion polymer battery or a lithium polymer battery.

* * * * *